United States Patent
Schweikl et al.

(10) Patent No.: US 10,054,095 B2
(45) Date of Patent: Aug. 21, 2018

(54) START-STOP DEVICE AND METHOD OF OPERATING SAME FOR INITIATING AN AUTOMATIC SHUTDOWN OF AN ENGINE OF A MOTOR VEHICLE

(71) Applicant: Bayerische Motoren Werke Aktiengesellschaft, Munich (DE)

(72) Inventors: Johann Schweikl, Munich (DE); Hubertus Doepke, Rosenheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/366,140

(22) Filed: Dec. 1, 2016

(65) Prior Publication Data

US 2017/0159632 A1    Jun. 8, 2017

(30) Foreign Application Priority Data

Dec. 2, 2015   (DE) .......................... 10 2015 224 109

(51) Int. Cl.
*F02N 11/08* (2006.01)

(52) U.S. Cl.
CPC ...... *F02N 11/0822* (2013.01); *F02N 11/0837* (2013.01); *F02N 2200/0801* (2013.01);
(Continued)

(58) Field of Classification Search
CPC ............. F02N 11/0822; F02N 11/0837; F02N 2300/2011; F02N 2200/125;
(Continued)

(56) References Cited

U.S. PATENT DOCUMENTS 8,672,809 B2 *   3/2014   Saito ...................... F02D 17/02
                                                                 477/101
8,919,314 B2 * 12/2014   Saito ................... F02N 11/0822
                                                                 123/179.4

FOREIGN PATENT DOCUMENTS

DE          100 23 331 A1       6/2001
DE          103 12 390 A1     10/2004
(Continued)

OTHER PUBLICATIONS

German Search Report issued in counterpart German Application No. 10 2015 224 109.2 dated Jul. 14, 2016 with partial English translation (12 pages).

*Primary Examiner* — Hai Huynh
(74) *Attorney, Agent, or Firm* — Crowell & Moring LLP

(57) ABSTRACT

A method and start-stop device for initiating an automatic shutdown of an engine, in particular a combustion engine, in a motor vehicle are provided, wherein an automatic shutdown of the engine is initiated if a condition triggering a stop has been met and no shutdown preventer has been met. A first condition triggering a stop is determined depending on a delay request, when with the triggered delay request a braking value is requested that exceeds a predetermined first shutdown braking threshold without exceeding a predetermined second shutdown braking threshold that is greater than the predetermined first shutdown braking threshold. A second condition triggering a stop is determined depending on a delay request, if with the triggered delay request a braking value is requested that exceeds the predetermined second shutdown braking threshold.

16 Claims, 2 Drawing Sheets

(52) U.S. Cl.
CPC ............... *F02N 2200/0807* (2013.01); *F02N 2200/102* (2013.01); *F02N 2200/12* (2013.01); *F02N 2200/125* (2013.01); *F02N 2300/2011* (2013.01); *Y02T 10/48* (2013.01)

(58) Field of Classification Search
CPC ......... F02N 2200/12; F02N 2200/0807; F02N 2200/0801; F02N 2200/102; Y02T 10/48
USPC ............ 123/179.3, 179.4; 701/110, 112, 113
See application file for complete search history.

(56) References Cited

FOREIGN PATENT DOCUMENTS

| | | |
|---|---|---|
| DE | 10 2008 020 182 A1 | 11/2009 |
| DE | 10 2008 031 340 A1 | 1/2010 |
| DE | 10 2009 012 847 A1 | 9/2010 |
| DE | 10 2010 003 753 A1 | 10/2011 |
| DE | 10 2010 003 757 A1 | 10/2011 |

\* cited by examiner

START-STOP DEVICE AND METHOD OF OPERATING SAME FOR INITIATING AN AUTOMATIC SHUTDOWN OF AN ENGINE OF A MOTOR VEHICLE

CROSS REFERENCE TO RELATED APPLICATION

This application claims priority under 35 U.S.C. § 119 from German Patent Application No. 10 2015 224 109.2, filed Dec. 2, 2015, the entire disclosure of which is herein expressly incorporated by reference.

BACKGROUND AND SUMMARY OF THE INVENTION

The invention relates to a method and a start-stop device for initiating an automatic shutdown (also known as a "shut-off") of an engine in a motor vehicle, wherein an automatic shutdown of the engine is initiated if a condition triggering a stop has been met and there is no effective shutdown preventer.

Currently, combustion engines are usually shut down by means of an ignition key, or when the driver manually actuates an operating element. An exception is a method that is introduced in DE 100 23 331 A1. With this method, instead of the ignition key, the position of a brake pedal and/or the pressure of the brake pedal are evaluated. The shutdown of the combustion engine is initiated if, after the motor vehicle comes to a standstill, the brake pedal is actuated stronger in its already actuated position. To continue driving, the brake pedal is let go and the gas pedal is pushed, after which a start of the combustion engine is initiated. What is disadvantageous with such methods is that the driver of the motor vehicle is alone responsible for shutting-off the combustion engine. Analyses of contemporary driving behavior show that despite an increased awareness of environmental issues and higher fuel prices, a manual shutdown of the combustion engine, such as at traffic lights, for example, rarely occurs independently.

To reduce fuel consumption and the emission of pollutants, systems that automatically shut down the combustion engine of a motor vehicle under certain conditions or if predetermined shutdown conditions have been met, and automatically start it up again after predetermined startup conditions have been met, are already being used in vehicles. Such methods and systems or start-stop devices are suitable primarily for driving in city traffic to reduce fuel consumption. This is because in city traffic, the vehicle often comes to a standstill at traffic lights or due to traffic and the operation of the combustion engine is not required.

Currently, the individual automotive manufacturers use various shutdown and startup logics that have varying advantages. For example, vehicles with automatic transmissions are on the market, where the engine is shut down automatically when the driver brakes, until the vehicle comes to a standstill. The engine is started up again as soon as the brake pedal is released. Another shutdown logic with automatic vehicles provides that the engine is not shut down until approx. 1 second after a standstill has been reached.

From DE 10 2009 012 847 A1, a method is known for the automatic shutdown of a combustion engine of a motor vehicle with an automatic transmission, wherein an automatic shutdown of the combustion engine is initiated when the monitored brake pressure or the monitored brake torque exceeds a predetermined shutdown braking threshold after the vehicle comes to a standstill. The shutdown braking threshold is composed of a standstill braking value (braking pressure or braking torque) and a safety allowance, wherein the standstill braking value is predetermined such that when applying the standstill braking value, the vehicle is barely held in the standstill. Thus, the driver can decide by his delay request (during standstill) whether he wants to initiate an automatic shutdown of the combustion engine (the braking pressure is so high that the shutdown braking threshold is exceeded) or not (the braking pressure is only high enough that the vehicle is held at a standstill, but the shutdown braking threshold is not exceeded). Such a shutdown logic is known, for example, under the term "MSA-on-demand."

Furthermore, shutdown logic schemes are also already known which can prevent inefficient automatic stops (for example because they are too short) by taking the traffic situation into account. DE 10 2008 031 340 A1 already discloses a method for influencing an MSA system, wherein the engine is automatically shut down when predetermined operating conditions have been met for a predetermined time. In addition, predictive information from navigation-, radar-, camera-, traffic control- and/or car-to-car communication systems is taken into account, which is to say, traffic information and information from other vehicles is evaluated and taken into account. Furthermore, the driver is notified by way of a display element of the result of the estimation so that the driver can react appropriately and correct the decision by actuating an operating element provided for said purpose if, based on the existing traffic data, a decision was made to prevent an automatic shutdown.

DE 10 2010 003 757 A1 further discloses an automatic start-stop system which, based on the determined position of the vehicle, determines a standstill time that corresponds to the position of the vehicle, which is provided to the engine-start-stop system. The corresponding standstill time for the vehicle position is determined using navigation data (such as the type of street, distance to intersections, time, data, statistical data, etc.).

DE 10 2010 003 753 A1 discloses an automatic start-stop system wherein with a navigational device, data about the vehicle's position and/or the route guidance are provided, which are taken into account in the decision of initiating an automatic shutdown.

The object of the invention is to provide an improved start-stop device, which on the one hand initiates only energy-efficient shutdowns, but simultaneously also takes into account the driver's intent and can react appropriately.

This and other objects of the invention are achieved in accordance with embodiments of the invention.

The invention proceeds on the principle that an automatic shutdown is always initiated if there is no existing shutdown preventer. However, the invention is also based on the idea to provide a shutdown logic for individual special situations, with the option of the driver deliberately suppressing an automatic shutdown. In addition, there should also be the option that when the driver basically allows the automatic initiation of a shutdown, the decision whether or not a shutdown makes sense is left up to the start-stop device, with the driver in turn being able to influence the system decision at least within certain bounds.

Taking into account the aforementioned consideration, the invention is directed to a start-stop device for initiating an automatic shutdown of an engine, in particular a combustion engine, in a motor vehicle, wherein an automatic shutdown of the engine is initiated when a condition triggering a stop has been met and no shutdown preventer has been met. To this end, the start-stop device includes various components and executes processing to:

Acquire a delay request triggered by actuating the brake pedal, acquire a first condition triggering a stop depending on a delay request, when at least because of the triggered delay request, a braking value is requested which exceeds a predetermined first shutdown braking threshold without exceeding a predetermined second braking threshold that is greater than the predetermined first braking threshold, acquire a second condition triggering a stop depending on a delay request, if, at least because of the triggered delay request, a braking value is requested that exceeds the predetermined second shutdown braking threshold, acquire effective shutdown preventers that have been met, if the first or second condition triggering a stop has been met, wherein the type and/or number of the effective shutdown preventers depends on the determined condition triggering the stop, and prompt an automatic shutdown of the engine if the first condition triggering a stop or the second condition triggering a stop has been met and no effective shutdown preventer has been met.

In other words, the start-stop device is thus set up to decide, based on the delay requested by the driver, which shutdown logic the driver prefers, which is to say, which condition triggering a stop is relevant in view of the decision whether or not an engine stop is to be initiated, and which shutdown preventers are effective and therefore have to be taken into account. If the triggered delay request requests a braking value that exceeds a predetermined first shutdown braking threshold without exceeding a predetermined second shutdown braking threshold that is greater than the predetermined first shutdown braking threshold, then this is interpreted as the driver's desire in favor of a first condition triggering a stop related to the delay request, and followed by the appropriate procedure. However, if the triggered delay request requests a braking value that exceeds the predetermined second shutdown braking threshold, then this is interpreted as the driver being in favor of a second condition triggering a stop related to the delay request, and followed by the appropriate procedure. If the triggered delay request merely requests a braking value that doesn't even exceed the first shutdown braking threshold, then this is interpreted as the driver's desire for not shutting off the engine.

There are various alternatives suitable for acquiring a delay request triggered by actuating the brake pedal. For example, a brake pedal sensor for acquiring the actuation of the brake pedal may be provided for this purpose, which, depending on the actuation angle, sends out a corresponding signal. The braking value requested with the delay request—appropriate means to determine said value are provided as well—advantageously may be the requested braking torque. Instead of an evaluation of the requested braking torque, it is also possible to evaluate the braking pressure or to evaluate the position of the brake pedal.

In an especially advantageous embodiment of the invention, the first braking torque shutdown threshold is defined such that it is formed by a standstill braking torque threshold and a safety allowance, wherein the standstill braking torque threshold is predetermined such that when the standstill braking torque threshold is applied (when the engine is on and/or shut off), the vehicle is barely held at a standstill. Thus, with a correspondingly minimal actuation of the brake pedal, the driver has the option to brake the vehicle to a standstill and keep it there without an automatic shutdown being initiated.

So as to be able to (predictively) at least take the traffic surroundings into consideration with a shutdown logic, it can be advantageously provided in a further refinement of the invention that at least one shutdown preventer is based on an evaluation of data of the surroundings depending on the traffic situation. The data of the surroundings can be obtained, for example, by evaluating camera, navigation, radar, lidar and/or received car-to-x data. Thus, it can be determined predictively, for example, whether (for example for reasons of energy efficiency) initiating an automatic shutdown makes sense, and according to the result of the determination, a shutdown preventer can "take action", if applicable.

If at least one shutdown preventer is based on the evaluation of data of the surroundings depending on the traffic situation, then the shutdown preventer (or all shutdown preventers based on the evaluation of data of the surroundings depending on the traffic situation) is advantageously effective only if the first condition triggering a stop depending on the delay request is determined to prompt an automatic shutdown, which is to say, when the triggered delay request requests a braking value that exceeds a predetermined first shutdown braking threshold without exceeding a predetermined second shutdown braking threshold. In contrast, if it is determined that the second condition triggering a stop depending on the delay request has been met, then advantageously, the activity of the, or all, shutdown preventers that are based on an evaluation of (prescient) data of the surroundings depending on the traffic situation is suppressed.

In an especially advantageous refinement of the invention, the activity of the shutdown preventers that are not absolutely necessary for the operation of the vehicle is suppressed if the second condition triggering a stop depending on the delay request is determined. Thus, in case of a corresponding delay request, the driver, in order to maintain a safe operation of the vehicle, can override potential shutdown preventers that exist, but do not necessarily have to be taken into account, which is to say, the new logic can override certain selectable shutdown preventers in that they do not become effective.

The group of shutdown preventers that are absolutely necessary for the operation of the vehicle advantageously includes only operation-relevant and safety-relevant shutdown preventers. Alternately or in addition, it is also possible that the driver himself—in addition to the shutdown preventers absolutely necessary for the operation of the vehicle—establishes (for example, separately for each shutdown logic) additional, absolutely necessary shutdown preventers via a vehicle-internal or a vehicle-external interface. In doing so, the driver can also select in advance, for example, whether he principally wants to have all absolutely necessary shutdown preventers that he himself has established taken into account, or only self-defined absolutely necessary shutdown preventers that were selected according to a rule.

To be able to determine whether the first or second condition triggering a stop depending on the delay request has been met, at least one additional parameter, such as, for example, the vehicle's speed, can also be advantageously determined and evaluated in addition to acquiring and evaluating a braking value requested because of the triggered delay request.

The vehicle's speed can be determined, for example, by evaluating the signals of a vehicle speed sensor. Instead of using a single speed sensor to determine the vehicle's speed, it is also possible to install a plurality of individual speed sensors (such as four, for example) at the wheels of the vehicle, with the vehicle's speed being determined from the signals of all speed sensors by use of a suitable method.

Taking into account these two determined parameters (the braking value requested because of a delay request, and the vehicle's speed), the first condition triggering a stop can be advantageously designed such that it is met and/or determined when the start-stop device is activated and the braking value (such as the braking torque, for example) requested based on the delay request is greater than the predetermined first shutdown braking threshold, and the vehicle's speed is less than a predetermined speed threshold.

In an especially advantageous refinement of the invention, it is provided that the automatic shutdown of the engine can not only be initiated after the vehicle has reached a standstill, which is to say, at zero speed, but rather already before the vehicle standstill has been reached. In particular, it has been provided to that end that the speed threshold is predetermined such that the automatic shutdown is initiated prior to reaching the standstill under the condition that there is no existing effective shutdown preventer, if the motor vehicle is braked based on a corresponding delay request and the determined speed of the vehicle is less than the predetermined speed threshold (such as 3 km/hour, for example) so that the engine is shut down approximately when the vehicle comes to a standstill. This has the advantage that the shaking of the engine as it shuts down can be hidden in the stop jerk.

Accordingly, in an especially advantageous refinement of the start-stop device according to the invention, the first condition triggering a stop has already been met before the vehicle comes to a standstill when the start-stop device is activated and the braking value requested based on the delay request is greater than the predetermined first shutdown braking threshold, and the vehicle speed is less than a predetermined positive speed threshold (such as 3 km/hour, for example). Furthermore, in addition or alternatively, the first condition triggering a stop may be met and therefore determined in the standstill of the vehicle if, when the start-stop device is active, the braking value requested based on the delay request (in particular within a predetermined first time interval that starts when the vehicle comes to a standstill) is greater than the predetermined first shutdown braking threshold.

With respect to the development of the second condition triggering a stop, the following specific refinements are advantageously contemplated.

In an especially advantageous refinement of the invention, the second condition triggering a stop can be met if, as the vehicle is at a standstill, the braking value requested based on the delay request exceeds the predetermined second shutdown braking threshold, which is (significantly) greater than the predetermined first shutdown braking threshold that is to be taken into account in the first condition triggering a stop.

So as to prevent that the second condition triggering a stop is met unintentionally because the driver, during a standstill, (unintentionally) slowly increases the pressure on the brake pedal, it is further proposed that the second condition triggering a stop is met and/or determined during an increased actuation of the brake pedal that includes exceeding the predetermined second shutdown braking threshold, only if during standstill of the vehicle, the braking value requested based on the delay request (by actuating the brake pedal) exceeds the predetermined, second shutdown braking threshold within a time interval that starts with the increased actuation of the brake pedal, which is to say, in addition to exceeding the predetermined shutdown braking threshold, the gradient of the braking value is evaluated and appropriately taken into account.

With respect to the development of the level of the second shutdown braking threshold, the following refinements are contemplated.

In an especially advantageous refinement, the predetermined second shutdown braking threshold can be formed from the predetermined first shutdown braking threshold and an offset braking value. Ideally, when considering the braking torque, the offset is more than 1000 Nm, in particular more than 1500 NM, and less than 3000 Nm, in particular less than 2500 Nm. Experiments have shown that an offset braking torque of approx. 1800 Nm is particularly advantageous.

If the second condition triggering a stop is designed such that in addition to exceeding the predetermined second shutdown braking threshold during standstill, the gradient of the braking value is taken into account as well, then according to an alternate variant, the predetermined second braking torque shutdown threshold can also always be formed by the braking value requested based on the delay request before a stronger actuation of the brake pedal and an offset braking value that is at least high enough that an "incidental" stronger actuation of the brake pedal generally does not lead to reaching the second shutdown braking threshold.

Alternately to the above specification of the second shutdown braking threshold, a case differentiation can be made depending on the currently requested braking value for the specification of the amount. If the braking value requested based on the (initial) delay request prior to the stronger actuation of the brake pedal is greater than the predetermined first shutdown braking threshold, the predetermined second shutdown braking threshold can be formed by the braking value requested based on the delay request prior to the stronger actuation of the brake pedal, and an offset braking value (such as 1800 Nm). However, if the braking value requested prior to the stronger actuation of the brake pedal is smaller than the predetermined first shutdown braking threshold, then the predetermined second shutdown braking threshold can be formed by the predetermined first shutdown braking threshold and an offset braking value (such as 1800 Nm, for example).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
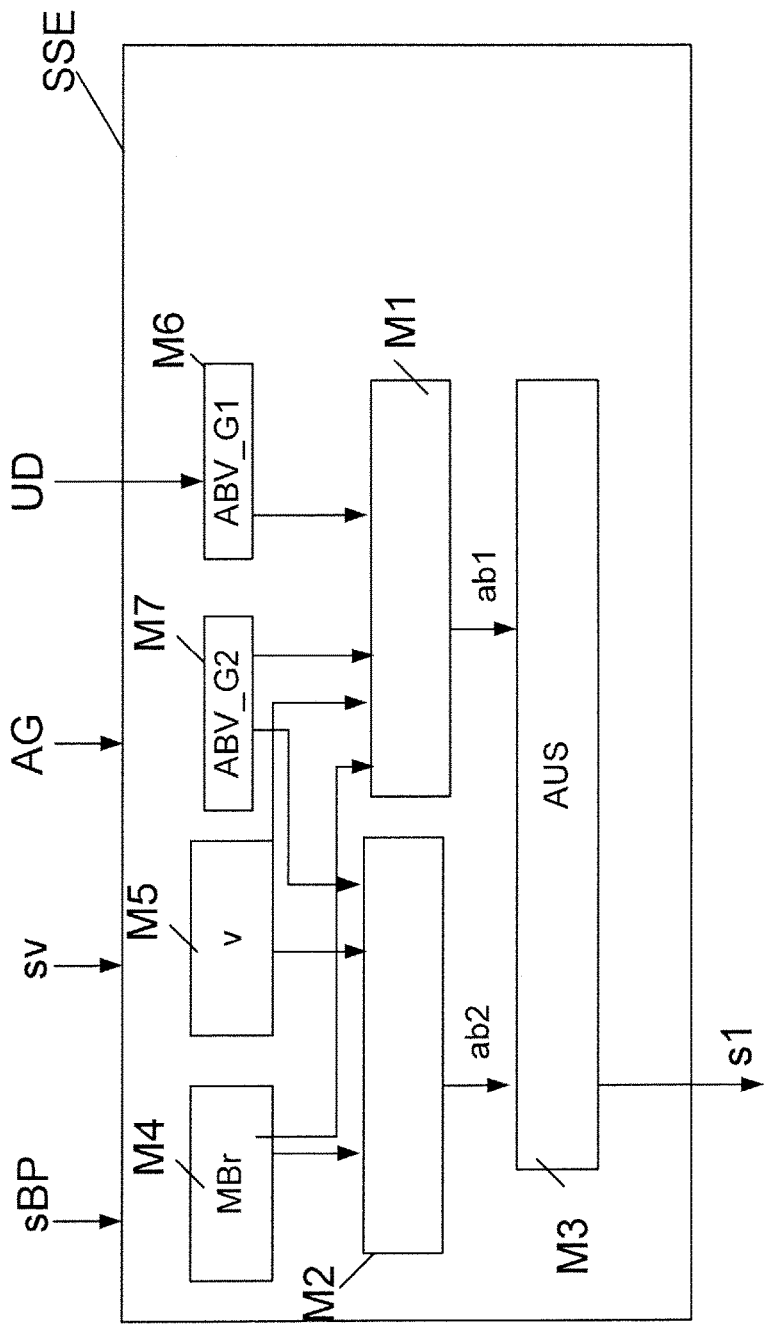
FIG. 1 is a schematic block diagram providing a detailed representation of a start-stop device according to an embodiment of the invention.

FIG. 1 shows a detailed representation of a start-stop device SSE for initiating an automatic shutdown of an engine, in particular as a combustion engine, in a motor vehicle with an automatic transmission to which the input signals sBP, sv, AG and UD are input.

In particular, the start-stop device SSE executes processing modules to:
- Determine a first condition triggering a stop depending on the delay request, and to determine any existing effective shutdown preventers (M1),
- determine a second condition triggering a stop depending on the delay request and to determine any existing effective shutdown preventers (M2), and
- prompt an automatic shutdown of the engine (s1) if the first condition triggering a stop or the second condition triggering a stop has been met and no related effective shutdown preventer has been met (M3).

To be able to determine whether one or two conditions triggering a stop have been met and there is no existing effective shutdown preventer, start-stop device further executes instruction modules to:
- Determine a delay request triggered by the operation of the brake pedal sBP (which is determined by means of a brake pedal sensor and transmitted to the start-stop device SSE as signal sBP) and the braking torque MBr requested by the delay request (M4);
- determine the vehicle speed v from the signal sv transmitted by at least one wheel speed sensor (M5);
- determine any existing shutdown preventers assigned to a first group ABV_G1, wherein said first group ABV_G1 comprises all shutdown preventers directed toward comfort and/or energy efficiency, however, in particular those shutdown preventers that are based on the evaluation of existing surrounding data DU depending on the traffic situation (M6); and
- determine existing shutdown preventers that are assigned to a second group ABV-G2, which are absolutely necessary for maintaining the operation of the vehicle (M7).

Specifically, the first module M1 is designed such that it determines a first condition triggering a stop depending on the delay request if the triggered delay request requests a braking torque MBr that exceeds a predetermined first shutdown braking threshold without exceeding a predetermined second shutdown braking threshold that is greater than the predetermined first shutdown braking threshold, and additionally, the current vehicle speed is at least zero or almost zero.

As long as the first condition triggering a stop is determined, it is furthermore evaluated whether the modules M6 and M7 transmit a signal that reveals that at least one shutdown preventer was determined from one of the two groups ABV-G1 or ABV_G2, which prevents the initiation of an automatic shutdown. If there is no existing information about a shutdown preventer, the first module M1, after a condition triggering a stop has been determined, transmits a signal ab1 to the third module M3 to initiate an automatic shutdown of the engine.

Analogously to this, the second module M2 is designed such that it determines a second condition triggering a stop depending on a delay request if the triggered delay request requests a braking torque MBr that exceeds the predetermined second shutdown braking threshold and in addition, the current speed of the vehicle is zero.

When the second condition triggering a stop is determined, it is furthermore evaluated whether the module M7 transmits a signal that reveals that from the group of the safety-relevant shutdown preventers ABV-G2, at least one shutdown preventer was determined which prevents the initiation of an automatic shutdown. If there is no information about a safety-relevant shutdown preventer, the second module M2, when determining a condition triggering a stop, transmits a signal ab2 to the third module M3 to initiate an automatic shutdown of the engine.

According to the exemplary embodiment, when a first condition triggering a stop has been met, an automatic shutdown is thus initiated only when there is no existing shutdown preventer. In contrast, when a second condition triggering a stop has been met, an automatic shutdown is initiated if there is merely no existing safety-relevant or operating-relevant shutdown preventer that is required for operating the vehicle.

This type of structure of a start-stop device SSE can ensure that despite existing shutdown preventers related to the traffic surroundings, the driver can initiate a shutdown as long as the shutdown is not critical for the safety and/or operation. This is an advantage because despite taking into account information about the surroundings, an automatic recognition of situations where a shutdown would make sense will generally always be less precise than a driver's personal estimation, because the driver is able to determine significantly more influential factors. Map errors or errors because maps in the navigation device are not up to date can also be overridden in this way.

Figure 2:
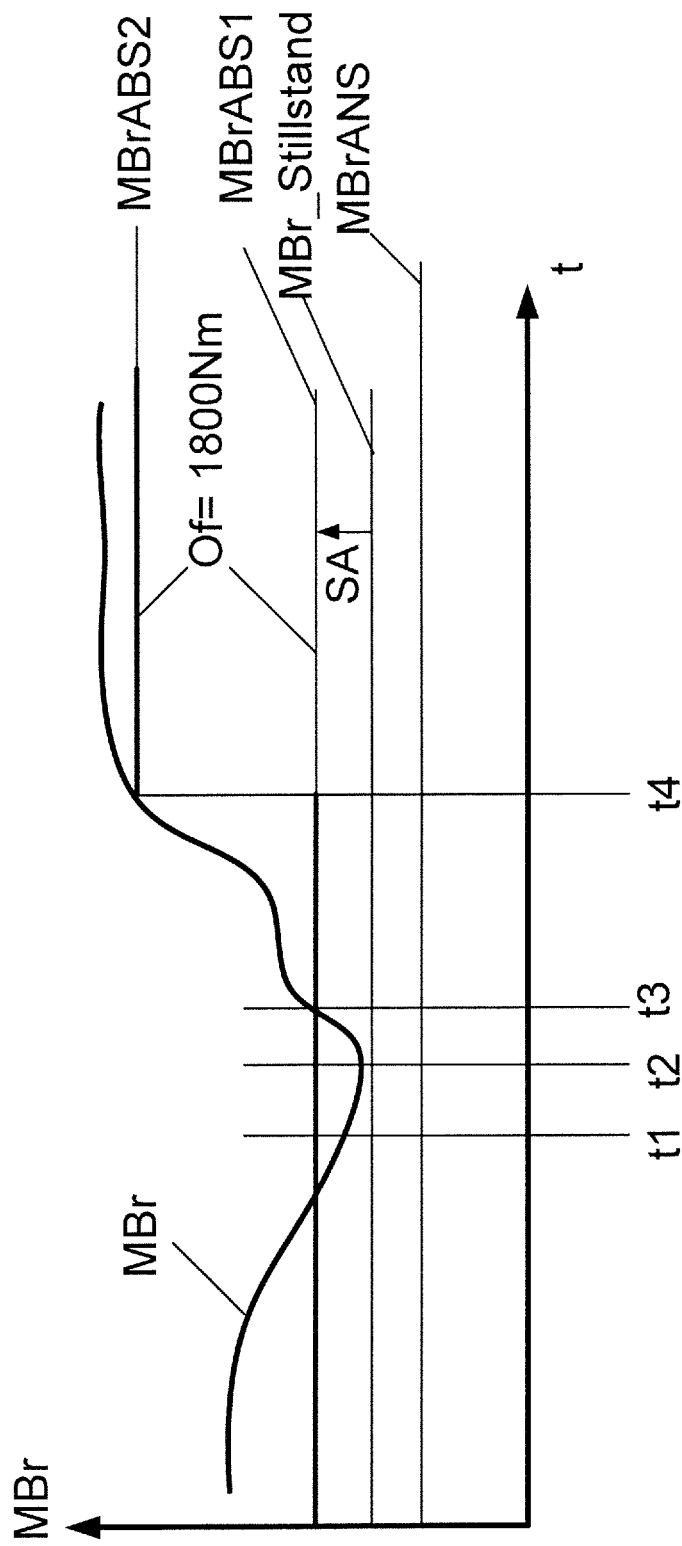
FIG. 2 is a graph of a braking torque progression to represent potential triggering times of an automatic shutdown of an engine.

FIG. 2 then shows a typical progression of the braking torque MBR, which was requested by actuating the brake pedal, during braking into a standstill.

In principle, the braking torque startup threshold MBrANS, which is relevant for initiating an automatic startup, is always below the braking torque shutdown threshold MBrABS1, which applies for a first condition triggering a stop, and the braking torque shutdown threshold MBrABS2, which applies for a second condition triggering a stop. The second shutdown threshold MBrABS2 is always greater than the first braking torque shutdown threshold MBrABS1.

The first braking torque shutdown threshold MBrABS1 is comprised of a standstill braking torque MBr_Stillstand and a safety allowance SA, wherein the standstill braking torque MBr_Stillstand is defined such that the vehicle, when the standstill braking torque MBr_Stillstand is applied when the engine is started up and shut down, is barely held at a standstill.

The driver first starts a braking process of the vehicle by actuating the brake pedal, which requests a braking torque MBr that is greater than the currently applicable first braking torque shutdown threshold MBrABS1. At the point in time t1, the vehicle's speed falls below the speed limit of 3 km/hour required for the first condition triggering a stop depending on a delay request. Likewise, during the braking process, the set braking pressure falls below the first braking torque shutdown threshold MBrABS1. Because from the point in time t1 on, the braking torque MBr applied by the brake pedal is no longer greater than the first braking torque shutdown threshold MBrABS1, no first condition triggering a stop is determined.

From the point in time t2 on, vehicle standstill has been achieved, wherein, however, a braking torque MBr, which is greater than the predetermined first shutdown braking torque threshold MBrABS1 (and smaller than the predetermined shutdown braking torque threshold MBrABS2) requested by the driver's delay request is applied only from the point in time t3 on. Thus, from the point in time t3 on, all conditions have been met so that the first condition triggering a stop depending on a delay is determined.

As long as the applied braking torque MBr is greater than the predetermined first shutdown braking torque threshold MBrABS1 and smaller than the predetermined second shutdown braking torque threshold MBrABS2, and the speed is less than 3 km/hour, it is checked whether there is an effective existing shutdown preventer for the first condition triggering a stop, which is to say, it is checked whether an automatic shutdown can be initiated or whether it has to be disabled because of a shutdown preventer. The shutdown preventers to be checked here are any type of shutdown preventer, which is to say, demands on comfort as well as energy needs are checked, as well as shutdown preventers related to the safety and the operation of the vehicle. As long as there is at least one existing shutdown preventer, no shutdown will be initiated.

This example proceeds on the assumption that there is an existing shutdown preventer related to comfort, which means that a shutdown is not initiated as long as the used up braking torque does not exceed the predetermined second shutdown braking torque threshold MBrABS2.

From the point in time t4 on, the requested and/or applied braking torque MBr then also exceeds the second predetermined shutdown braking torque threshold MBrABS2, which here is to be taken as an indication that the driver at least does not want to have the shutdown preventers related to comfort taken into account, or that he wants to override them. This is why now only the shutdown preventers relevant to safety and operation are checked when the predetermined second shutdown braking torque threshold is exceeded during standstill. If no such shutdown preventer exists, an automatic shutdown is initiated.

With the start-stop device according to the invention proposed here, the driver therefore can, in a simple manner, use the brake pedal to choose between manually suppressing a shutdown, prioritizing an automatic shutdown (if possible), and prioritizing a forced shutdown (at least if there is no existing shutdown preventer that is required for the operation of the vehicle).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a start-stop device for initiating an automatic shutdown of an engine, wherein the automatic shutdown of the engine is initiated when a condition triggering a stop has been met and no shutdown preventer is present, the method comprising the acts of:
   determining a delay request (sBP) triggered by actuating a brake pedal;
   determining a first condition triggering a stop depending on a delay request if the triggered delay request (sBP) requests a braking value (MBr) that exceeds a predetermined first shutdown braking threshold (MBrABS1) without exceeding a predetermined second shutdown braking threshold (MBrABS2) that is greater than the predetermined first shutdown braking threshold (MBrABS1);
   determining a second condition triggering a stop depending on a delay request if the triggered delay request (sBP) requests a braking value (MBr) that exceeds the predetermined second shutdown braking threshold (MBrABS2);
   determining effective shutdown preventers (ABV_G1, ABV_G2) that are present, if the first or second condition triggering a stop is determined, wherein a type and/or a number of the effective shutdown preventers (ABV_G1, ABV_G2) depend on the determined condition triggering a stop; and
   initiating (Si) an automatic shutdown of the engine if the first condition triggering a stop or the second condition triggering a stop has been met and no effective shutdown preventer (ABV_G1, ABV_G2) is present.

2. The method according to claim 1, wherein the first shutdown braking threshold (MBrABS1) is formed from a standstill braking torque threshold (MBr_Stillstand) and a safety allowance (SA), wherein the standstill braking torque threshold (MBr_Stillstand) is predetermined such that a vehicle is held barely at a standstill when the standstill braking torque threshold (MBr_Stillstand) is applied.

3. The method according to claim 1, wherein at least one shutdown preventer (ABV_G1) is based on an evaluation of data of surroundings based on a traffic situation.

4. The method according to claim 3, wherein by meeting the second condition triggering a stop, an activity of at least one shutdown preventer (ABV_G1) based on an evaluation of the surrounding data (UD) depending on the traffic situation is suppressed.

5. The method according to claim 1, wherein by meeting the second condition triggering a stop, an activity of shutdown preventers (ABV_G1) that are not absolutely necessary for operation of a vehicle is suppressed.

6. The method according to claim 1, wherein the first condition triggering a stop depending on the delay request has been met if, when the start-stop device is activated, the braking value (MBr) requested based on the delay request is greater than the predetermined first shutdown braking threshold (MBrABS1) and a vehicle speed (v) is less than a predetermined speed threshold.

7. The method according to claim 6, wherein the first condition triggering a stop depending on a delay request has been met prior to reaching vehicle standstill if, when the start-stop device is activated, the braking value (MBr) requested based on the delay request (sBP) is greater than the predetermined first shutdown braking threshold (MBrABS1) and a vehicle speed (v) is less than a predetermined positive speed threshold.

8. The method according to claim 7, wherein the first condition triggering a stop depending on a delay request has been met at a vehicle standstill if, when the start-stop device is active, the braking value (MBr) requested based on the delay request (sBP), within a predetermined first time interval that starts when reaching vehicle standstill, is greater than the predetermined first shutdown braking threshold (MBrABS1).

9. The method according to claim 8, wherein the second condition triggering a stop has been met if, during a standstill of the vehicle, the braking value (MBr) requested based on the delay request (sBP) exceeds the predetermined second shutdown braking threshold (MBrABS2) and the vehicle speed (v) is less than a predetermined speed threshold or zero.

10. The method according to claim 9, wherein the predetermined second shutdown braking threshold (MBrABS2) is formed from the predetermined first shutdown braking threshold (MBrABS1) and an offset braking value (Of).

11. The method according to claim 1, wherein the first condition triggering a stop depending on a delay request has been met prior to reaching vehicle standstill if, when the start-stop device is activated, the braking value (MBr) requested based on the delay request (sBP) is greater than the predetermined first shutdown braking threshold (MBrABS1) and a vehicle speed (v) is less than a predetermined positive speed threshold.

12. The method according to claim 1, wherein the first condition triggering a stop depending on a delay request has been met at a vehicle standstill if, when the start-stop device is active, the braking value (MBr) requested based on the delay request (sBP), within a predetermined first time interval that starts when reaching vehicle standstill, is greater than the predetermined first shutdown braking threshold (MBrABS1).

13. The method according to claim 1, wherein the second condition triggering a stop has been met if, during a standstill of the vehicle, the braking value (MBr) requested based on the delay request (sBP) exceeds the predetermined second shutdown braking threshold (MBrABS2) and the vehicle speed (v) is less than a predetermined speed threshold or zero.

14. The method according to claim 1, wherein the predetermined second shutdown braking threshold (MBrABS2) is formed from the predetermined first shutdown braking threshold (MBrABS1) and an offset braking value (Of).

15. The method according to claim 1, wherein the braking value (MBr) and the corresponding first and second shutdown braking thresholds (MBrABS1, MBrABS2) are braking torques, braking pressures, or positions of the brake pedal.

16. A start-stop device that initiates an automatic shutdown of an engine, wherein the automatic shutdown of the engine is initiated when a condition triggering a stop has been met and no shutdown preventer is present, the start-stop device comprises:
    a processor to carry out the functions of:
    determining a delay request (sBP) triggered by actuating a brake pedal;
    determining a first condition triggering a stop depending on a delay request if the triggered delay request (sBP) requests a braking value (MBr) that exceeds a predetermined first shutdown braking threshold (MBrABS1) without exceeding a predetermined second shutdown braking threshold (MBrABS2) that is greater than the predetermined first shutdown braking threshold (MBrABS1);
    determining a second condition triggering a stop depending on a delay request if the triggered delay request (sBP) requests a braking value (MBr) that exceeds the predetermined second shutdown braking threshold (MBrABS2);
    determining effective shutdown preventers (ABV_G1, ABV_G2) that are present, if the first or second condition triggering a stop is determined, wherein a type and/or a number of the effective shutdown preventers (ABV_G1, ABV_G2) depend on the determined condition triggering a stop; and
    initiating (Si) an automatic shutdown of the engine if the first condition triggering a stop or the second condition triggering a stop has been met and no effective shutdown preventer (ABV_G1, ABV_G2) is present.

* * * * *